June 6, 1939. C. HOLM 2,161,469
LABELING MACHINE
Filed Aug. 11, 1936 11 Sheets-Sheet 1

Fig. 1

Inventor
Carl Holm

June 6, 1939.    C. HOLM    2,161,469
LABELING MACHINE
Filed Aug. 11, 1936    11 Sheets-Sheet 10

Fig. 27.

June 6, 1939. C. HOLM 2,161,469
LABELING MACHINE
Filed Aug. 11, 1936 11 Sheets-Sheet 11

Patented June 6, 1939

2,161,469

UNITED STATES PATENT OFFICE 2,161,469

LABELING MACHINE

Carl Holm, Worcester, Mass., assignor to Economic Machinery Company, Worcester, Mass., a corporation of Massachusetts Application August 11, 1936, Serial No. 95,371

12 Claims. (Cl. 216—59)

The principal objects of this invention are to provide a labeling machine which will occupy less space than has been the case heretofore; to save space by constructing a labeling machine partly on the straight line principle and partly rotary; to provide a machine in which the bottles are fed along a course and then will go on one of a series of conveyors then automatically be fed into one of a corresponding series of labeling machines without attention; to provide a straight path for the bottles tangent to an intermittently rotating labeling machine through which the bottles enter it and automatic means for moving them radially into said machine; to provide for the discharge of the bottles to the delivery table radially with respect to the labeling machine and complete the wiping during that radial motion; to provide means whereby the bottles will proceed in the labeling machine by an intermittent rotary motion; to provide an oscillating means for causing these intermittent motions; to provide a bottle support at the bottom and a top plunger movable vertically simultaneously but oppositely so as to clamp the bottles; to provide for moving the bottles so clamped in a circular path intermittently to advance them; to provide for pressure wiping without any motion of the wipers along the surfaces of the bottles while they are being wiped; to provide a final spring sliding wiper perpendicular to the surface of the lower label and a final pressure wiping operation of the neck label comprising rotary wipers which can move along with the label; to provide an improved means for clamping down the bottle and improved means economically associated therewith for raising the bottle carrier; and to provide an improved discharge bottle pusher.

Other objects and advantages of the invention will appear hereinafter.

Reference is to be had to the accompanying drawings, in which

Fig. 2ª is an end view of a feature thereof, looking in the direction of the arrow 2ª in Fig. 2;

Fig. 28 is a diagrammatic plan of a series of these machines associated with each other.

Referring to Fig. 28, this labeling machine is so constructed that, by means of conveyors on which the bottles are conducted, they can be taken from the pasteurizer and delivered along a conveyor 10. This conveyor has side conveyors 11 extending from it at several points and in a transverse direction. Some of the bottles are delivered to each of the conveyors 11 and when any conveyor 11 is filled they pass along the conveyor 10 to the next conveyor.

This invention is to be used with a plurality of labeling machines to one of which each conveyor 11 delivers. A pusher 12 removes a bottle from a conveyor 11 and delivers it to the labeling machine by the movement of the pusher to the right. This leaves a bottle on a rotary labeling machine but this machine has an intermittent rotary motion due to the oscillating action of a bottle carrier 13 underneath. This labeling machine therefore is located close to the conveyor 11 and is of comparatively small size thus occupying a comparatively small space together with the conveyor. A gum box 15 is indicated in this figure. A delivery conveyor 16 takes the bottles off the labeling machine and delivers them on a delivery table 17. In this way batteries of several machines can be employed and take up very little space.

Figure 1:
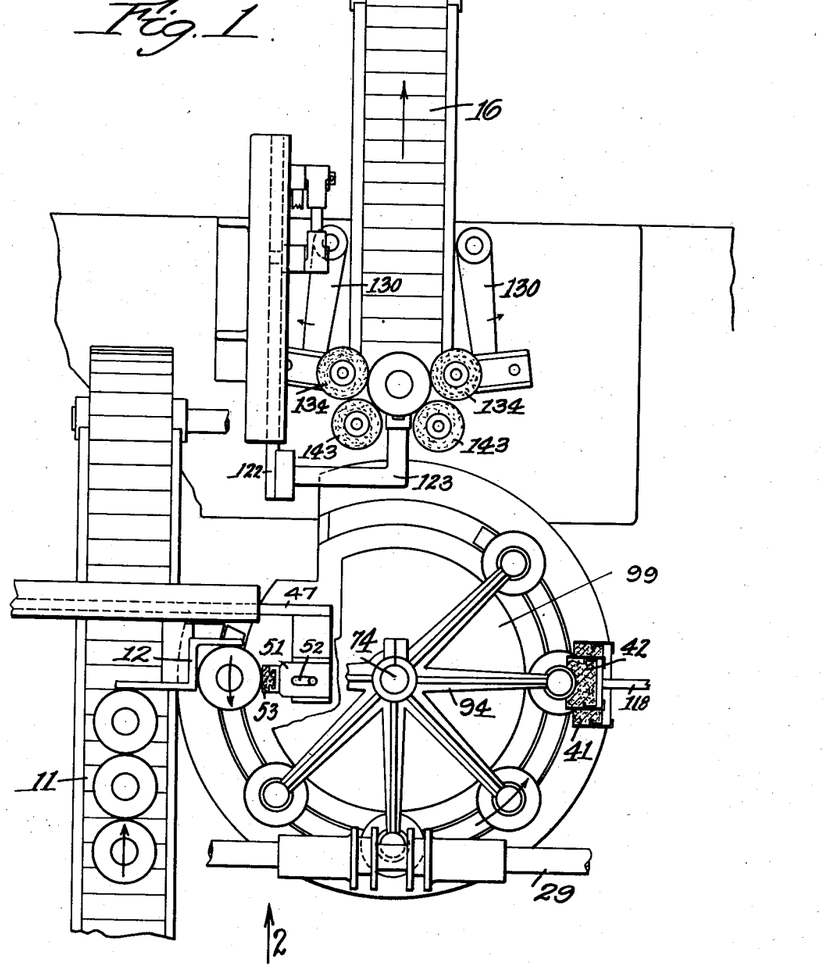
Fig. 1 is a plan of a labeling machine showing a preferred embodiment of this invention.
Figures 2, 2A:
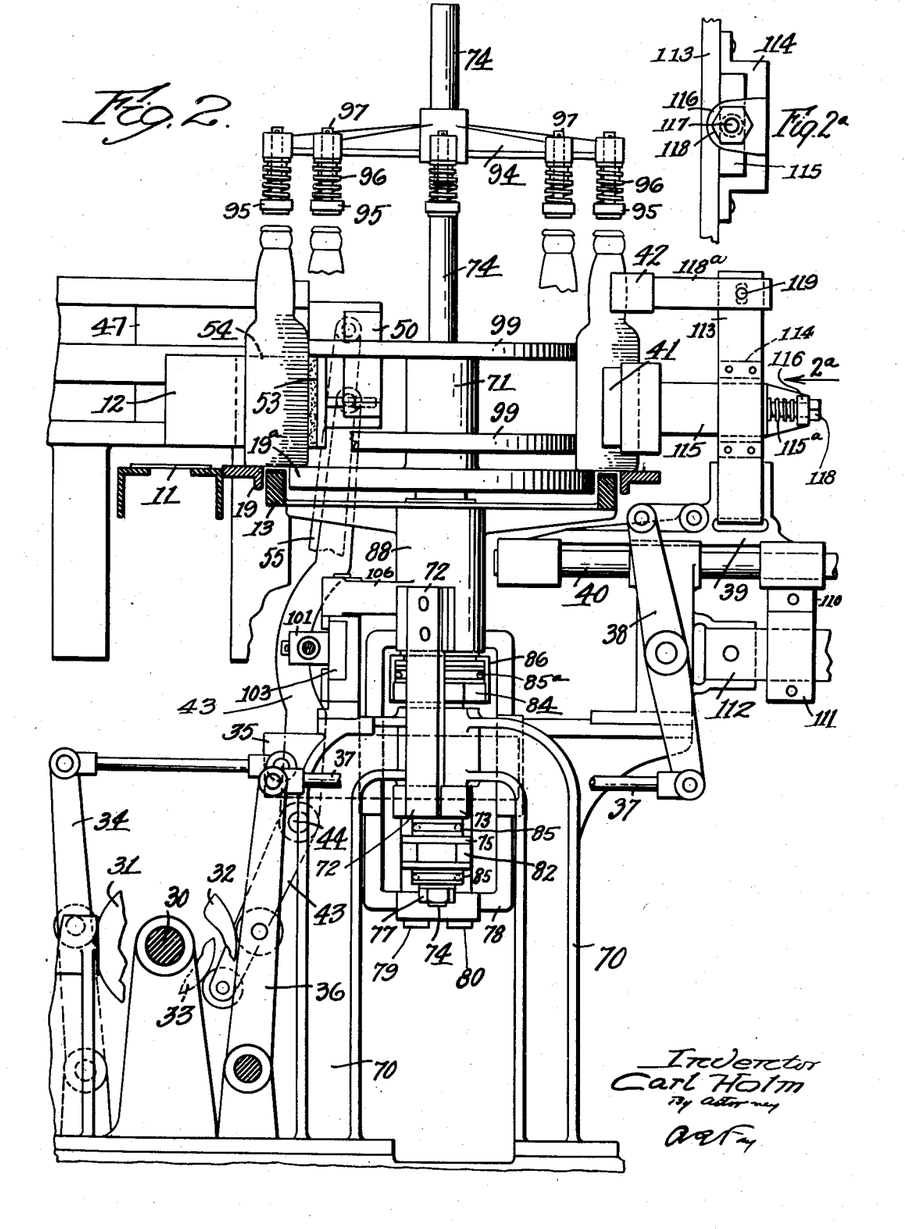
Fig. 2 is a front view of said machine looking in the direction of the arrow 2 in Fig. 1.
Figure 27:
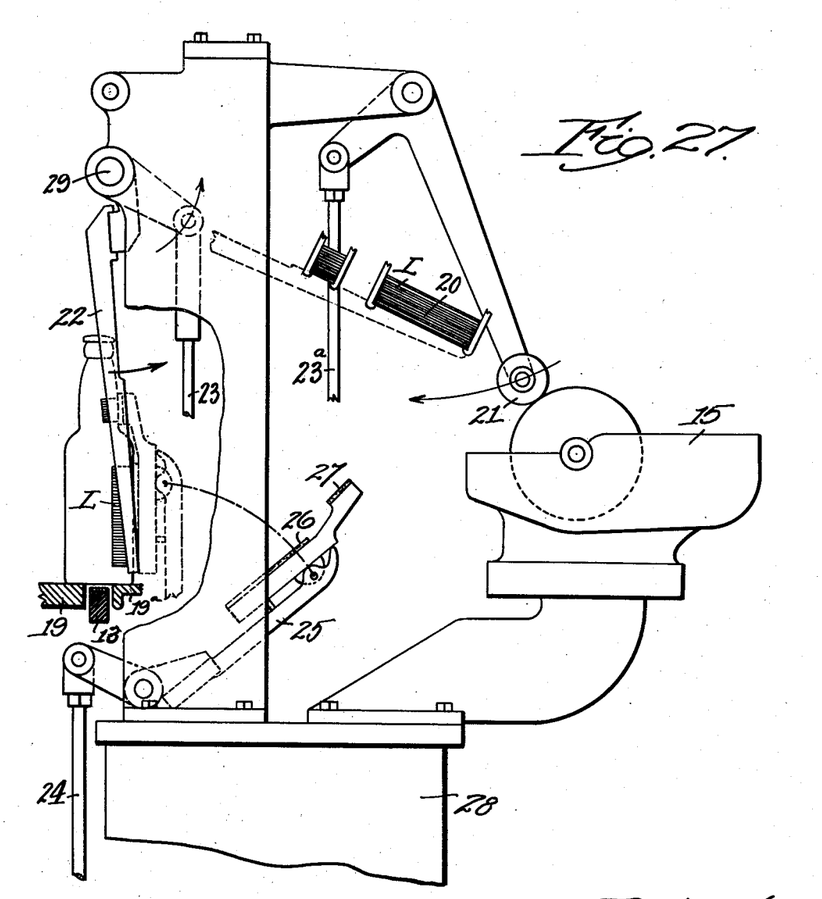
Fig. 27 is a general elevation of the labeling machine showing mostly parts not illustrated above, namely the gumming and picking device.
Figure 29:
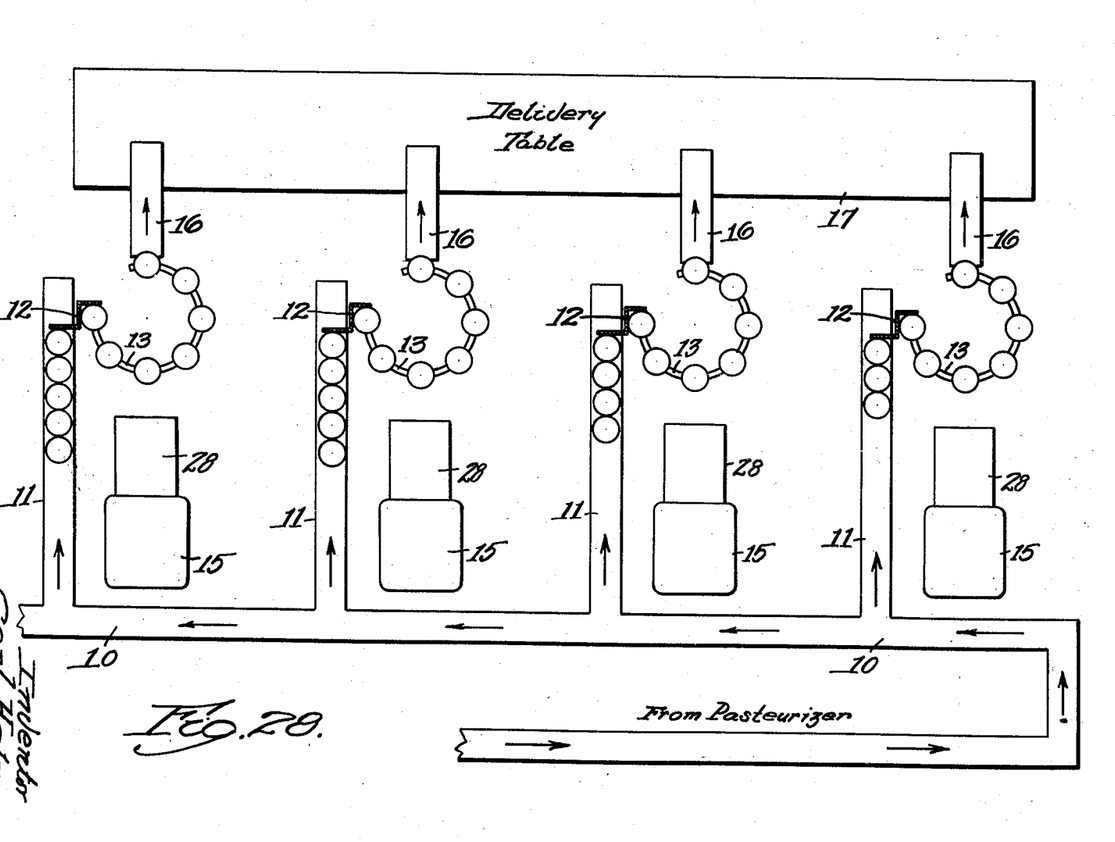

The machine is provided with the usual features, several of which are shown in Fig. 27 to indicate how they are related to the main labeling mechanism. The rotary bottle carrier 13 and the bottle supports 19 and 19ᵃ operate to rotate the bottles intermittently. The gum is applied to the labels 20 through the gum box 15, transfer roll 21 and picker 22 which moves to the two extreme positions shown in Fig. 27. The roll 21 passes along the lower side of the picker. This picker 22 is operated through a rod 23 from a cam, not shown, through a shaft 29. They bring the previously labeled bottles, or the like, to the position shown in Fig. 2 and stop.

The transfer roll 21 is operated by a rod 23ᵃ by a cam, not shown. From another cam, not shown, operates a rod 24 and an arm 25 which supports two label holders 26 and 27. These holders are pressed against the body and neck labels respectively to hold the label when it is first put on by the picker. They move up from the position shown in full lines to that shown in dotted lines and hold the labels L against the bottle. There is a frame 28 which supports all these parts.

The power for the machine, or at least most of it, is delivered through a driven shaft 30 on which are cams 31, 32 and 33. The cam 31, through a roller, operates a pivoted lever 34 connected to a bottle carrier slide 35 and, of course, reciprocates that slide. The cam 32 reciprocates two pressure wipers 41 and 42, one for the body label and another for the neck label. The cam 33 operates a lever 43 pivoted at 44 which, extending upwardly, operates the feed slide 12, through a link 45.

As the bottles are conveyed by the conveyor 11, they are engaged by the pusher feed slide 12 which is provided with a transverse surface for engaging a bottle. When the slide is moved forward to the right, the bottle is pushed over the side of the conveyor 11 and is positioned just over the bottle carrier 13.

Figures 3, 4:
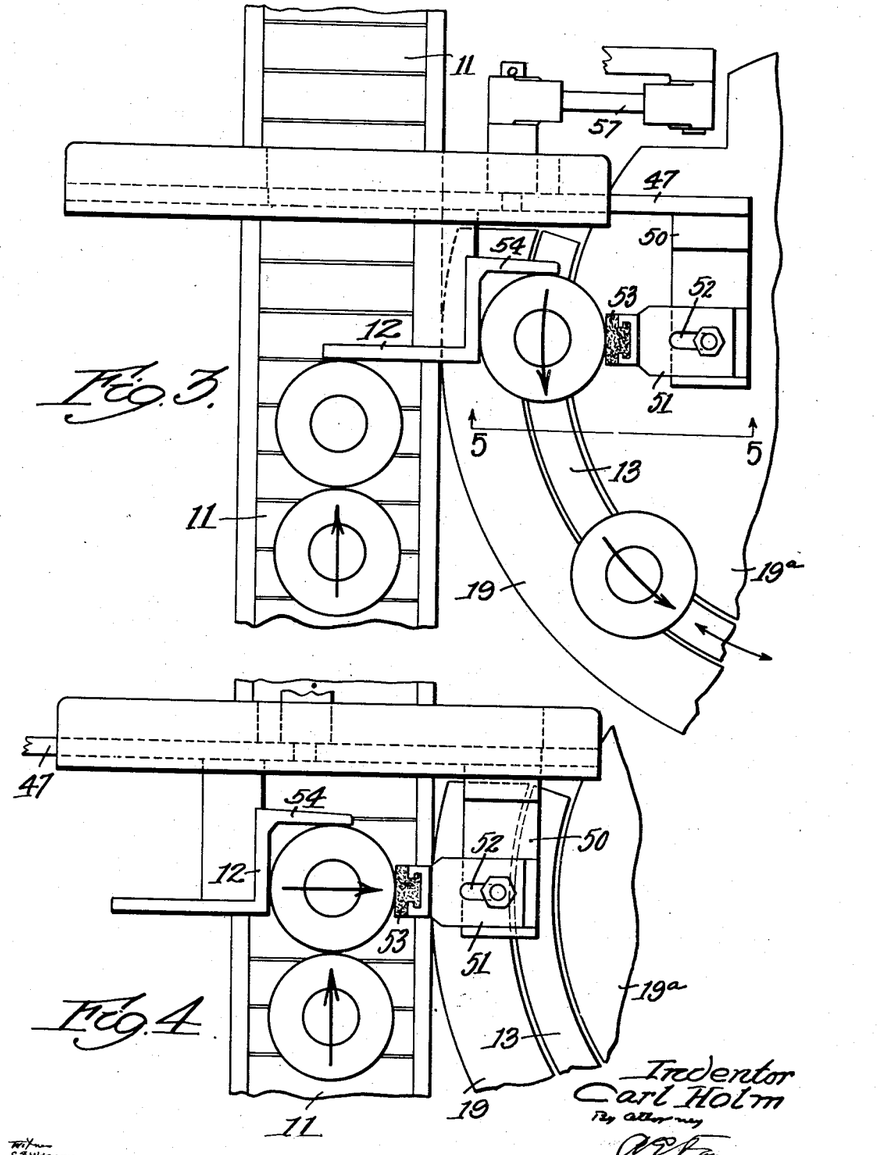
Fig. 3 is a plan on an enlarged scale of the feeding mechanism in one position.
Fig. 4 is a similar plan showing the parts in another position.
Figure 5:
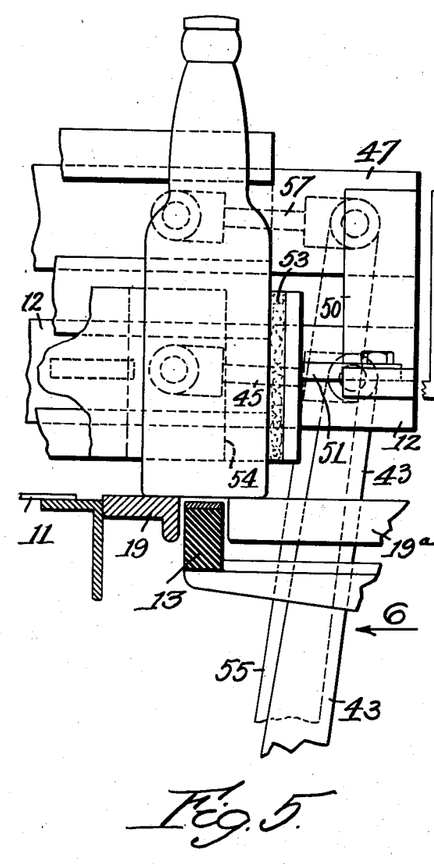
Fig. 5 is a sectional view on the line 5—5 of Fig. 3, showing the bottle at rest and in elevation.
Figure 6:
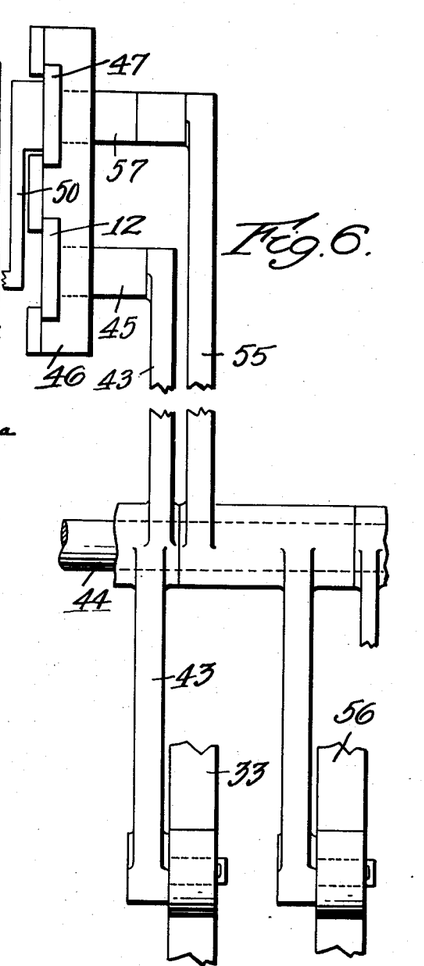
Fig. 6 is an elevation looking in the direction of the arrow 6 in Fig. 5.
Figures 7, 8, 9, 10:
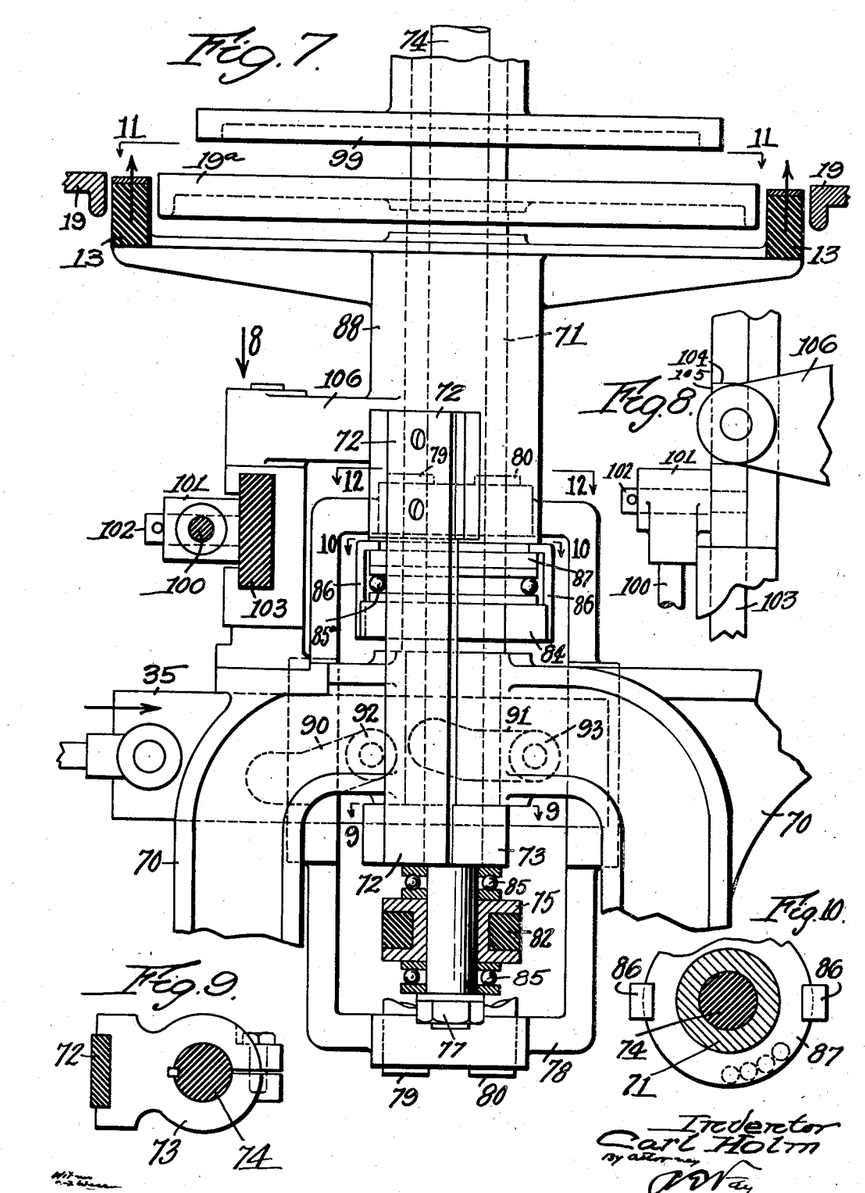
Fig. 7 is an elevation on enlarged scale similar to the front view in Fig. 2 with parts in section.
Fig. 8 is a plan of a part of the machine looking in the direction of the arrow 8 in Fig. 7.
Fig. 9 is a sectional view of a clamp, taken on the line 9—9 of Fig. 7.
Fig. 10 is a sectional view on the line 10—10 of Fig. 7, showing a pair of clamps.
Figures 11, 12, 13, 14, 15, 16:
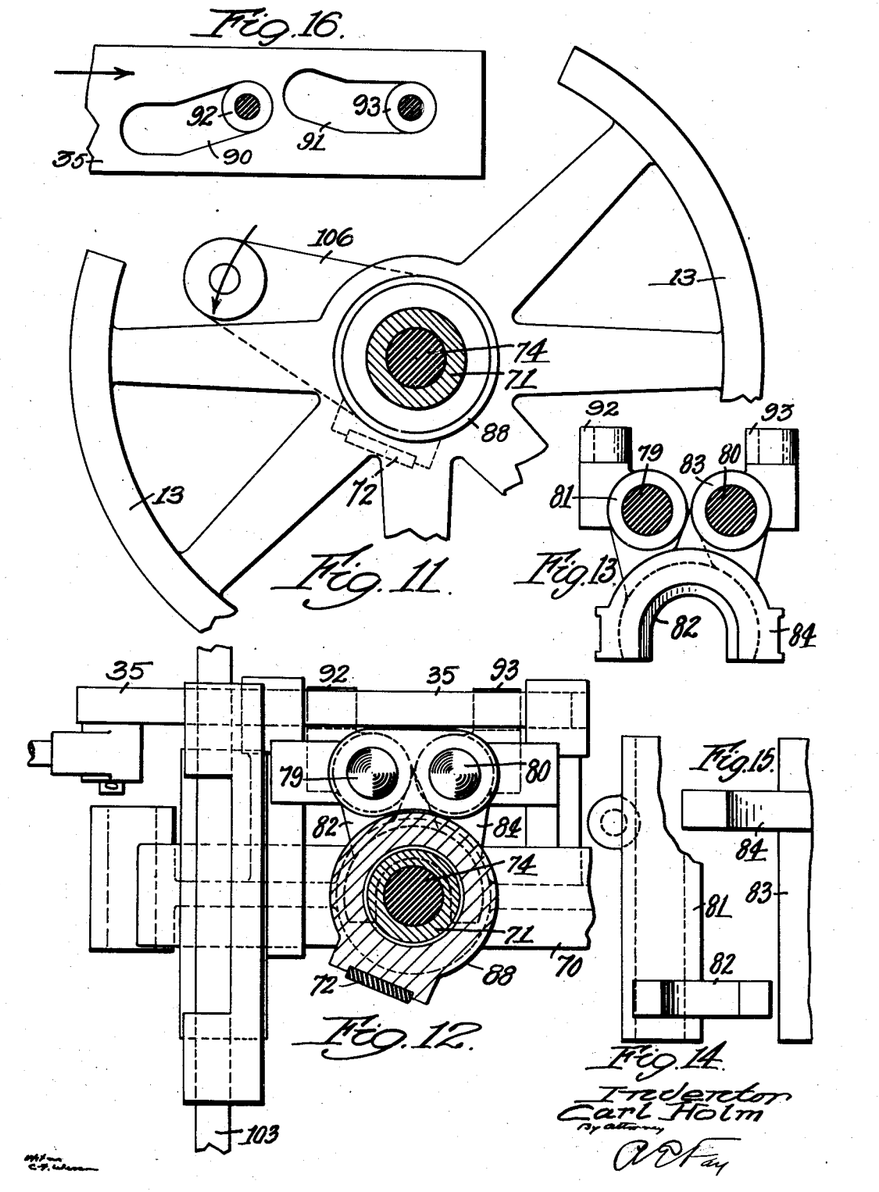
Fig. 11 is a sectional view on the line 11—11 of Fig. 7 showing the oscillating bottle carrier in plan.
Fig. 12 is a sectional view on the line 12—12 of Fig. 7 showing the slide and other parts in plan.
Fig. 13 is a plan of the clamps for clamping down the bottle and for raising the carrier and bottle.
Fig. 14 is a side view of the clamp for clamping down the bottle and the fork connected with it.
Fig. 15 is a similar view for the clamp that raises the carrier.
Fig. 16 is a front view of the bottle carrier slide.
Figures 17, 18, 19, 23, 24, 25, 26:
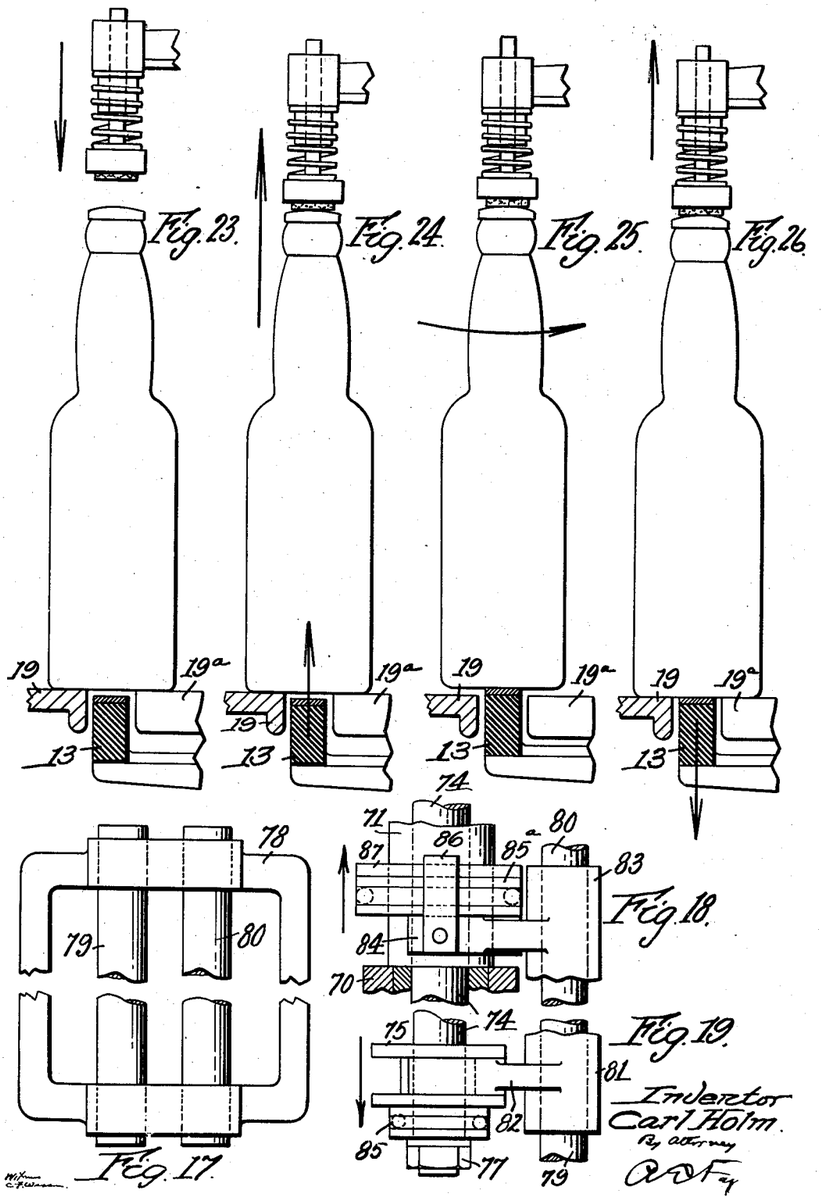
Fig. 17 is an elevation of a bracket and the rods on which the forks slide.
Fig. 18 is an elevation of the sleeve, clamp and fork which raise the bottle carrier.
Fig. 19 is a similar view of the corresponding parts, which clamp down the bottles.
Figs. 23, 24, 25 and 26 are elevations showing four positions occurring in the process of clamping the bottle and releasing it.

There is also an upper slide 47, the purpose of which is to carry an L-shaped piece 50 which is provided, on its horizontal post, with a block 51 adjustable through a slot 52. This block carries a rubber member 53 in alignment with the feed slide 12. The bottle is not merely pushed on the bottle carrier from the conveyor 11, but is held at opposite sides. It is picked up bodily and moved over on the labeling machine. The slide 12 also has a forward projection 54, which engages the bottle, and keeps it in proper location, longitudinally, of the conveyor, as seen in Figs. 3 and 4.

The slide 12 moves, supported by its guide 46, while the member 53 is stationary in order to grip the bottle. The way in which the slide 12 is operated has been stated.

The slide 47 is operated independently through a lever 55 operated from a similar cam 56 on the shaft 30 through a link 57. These two slides are operated so as to grip the bottle as stated and then they both move together to deposit the bottle on the bottle carrier. Then the slide 12 moves back without taking with it the member 53. Finally the top slide 47, in its guide 46, takes with it the member 53 and moves to the original position shown in Fig. 3.

These various elements that have been described are all supported by a frame 70. This frame has at the top and at the center a hub having an opening in which a stationary sleeve 71 is supported. An outside sleeve or cylinder 88 carries the oscillatable bottle carrier 13. This sleeve 88, which is free on the sleeve 71, carries a steel guide 72, which is secured to the sleeve and passes down. At the bottom it is guided in a clamp 73. Inside the sleeve 71 is a central vertical rod 74 carrying a collar 75 held between ball bearings 85 and a bottom nut 77 and collar.

Fixed to the frame 70 is a rectangular bracket 78 carrying two rods 79 and 80. On the rod 79 slides a sleeve 81 which is provided with a fork 82. This fork clamps down the bottles by entering the collar 75 and pressing down on it, thus bringing down the rod 74.

On the rod 80 slides a sleeve 83 carrying a fork 84 which extends under and raises a ball bearing 85ᵃ and clamps 86 which clamp the bearing to a disc 87. This disc 87 bears on the under side of a sleeve 88 on which is fixed the oscillatable bottle carrier 13.

The bottle carrier slide 35 is provided with two cam slots 90 and 91 for receiving respectively a pair of rolls 92 and 93 which are carried on the arms that extend from the sleeves 81 and 83. These arms are swung on their axes 79 and 80 by the reciprocating motion of the bottle carrier slide 35 through the action of these cam slots.

It will be seen that, from a central normal position, the rolls 92 and 93 will be moved in sequence, but one of them will be moved up and the other down. These rolls operate the two forks 82 and 84 respectively, one of which, through a collar 75, forces down the rod 74 and the other of which forces up the sleeve 88.

On said rod 74 is a head 94 which is provided with spokes carrying caps 95 one for each bottle on the bottle support 13. Each is held down by a spring 96 and guided by a short rod 97. Therefore, the moving downwardly of the rod 74 will move down these caps on the bottles and force the bottles down firmly on the carrier 13 under spring pressure. On the other hand, when the bearing 85ᵃ and the disc 87 are raised, the carrier 13 and head 94 will be raised to lift the bottles. The bottles are then carried by the carrier 13. There are two discs 99 which engage the bottles and help hold them in position.

A rod 100 operated by a cam, not shown, reciprocates a head 101 which, by a pin 102, reciprocates a slide 103 for the bottle carrier 13. This slide has a space 104 into which projects a roll 105 on an arm 106 which is connected to and oscillates the sleeve 88. This sleeve is connected with the oscillatory bottle carrier 13 and oscillates it.

The cam 32 operates through a roller on a lever 36 to reciprocate a rod 37 and through a lever 38, reciprocates a pressure wiper frame 39, sliding on a rod 40. To keep the frame 39 from swinging, it is provided with a downward projection 110 which has a member 111 spaced at the center from the projection 110 to receive a stationary guide 112. This is located below the frame 39. This frame also carries an upwardly extending arm 113 which also carries a plate 114 on the back to provide a space for receiving a support and guide 115 for the pressure wiper 41. This support is provided with a spring 115ᵃ held by a projection 116, rod 117, and nut 118 to apply a little pressure back of this wiper. The other wiper is carried by an arm 118 adjustably connected with the plate 113 by a pin 119 and slot.

The neck wiper is normally held back from the bottle neck, as shown, so as not to engage the neck before the bottle is clamped between the wiper 41 and discs 99. As the slide 39 moves forward the spring 115ᵃ yields and the neck wiper 42 engages the neck after the bottle is held in stationary position. On the reverse motion the neck wiper leaves the bottle neck before the body wiper 41 leaves the bottle.

From a cam, not shown, a lever 120 is operated. This lever, through an adjustable link 121, operates a slide 122 which carries on it a discharge pusher 123. This pusher has a head which engages the bottle and, when it is moved outwardly radially, it will push the bottle off the carrier 13 on the discharge conveyor 16.

From a cam, not shown, is operated a lever 124 which, through an adjustable link 125, operates a slide 126. This slide carries a pin 127 which operates two bell cranks 128 which have arms which are connected by a spring 129. On the shafts of the bell cranks 128 are two back wiper arms 130. On these arms 130 are fixed two bases 133 which carry a pair of soft rubber surfaced rolls 134, preferably sponge rubber. On an upward extension 135 a pair of similar rolls 136 are carried.

On a pair of brackets 137 pivoted at 138 and having arms extending upwardly, which are normally held together by springs 139, are carried a pair of wiper arms 140. These arms are provided with bases 141 on the top carrying vertical rods 142 on which are freely and rotatably mounted wipers 143. Also an extension 144 projects upwardly and carries a neck wiper 145.

Therefore, when the pusher 122 is pushed forward it will carry the bottle, as stated, not only off the carrier 13 but through the two wipers 143 which are merely pulled toward each other by means of the spring 139. These are to further lay down the labels and as the bottle goes further it is engaged by steadying rollers 134 to steady the bottle. The bottles are then freed from this machine and move along the conveyor 16 to the delivery table 17.

As has been explained, the bottles or other articles to be labeled are taken from the pasteurizer or other device for preliminary preparation along a conveyor or the like and deposited on the conveyor 10. The bottles are then transferred from this conveyor to a series of transverse conveyors 11. These conveyors are arranged at suitable intervals parallel to each other. Next to each one is a circular labeling machine.

By means of a pusher 12 the bottles are pushed from each one of the conveyors or guides 11 laterally into the corresponding labeling machine. When the bottle is being given this motion it is held between a transverse surface on the pusher 12 and the member 53, diametrically opposite it.

Thus the bottle is not free at any time to be pushed from one point to another but is held between these two surfaces and moved under the control of the pressure between them.

The bottle in this way is moved on the labeling machine which consists of three parts, the oscillatory bottle carrier 13, and the two fixed surfaces 19 and 19a, all circular. The means for rotating the bottle carrier 13 in an intermittent forward manner have been described in full. Each bottle is carried to a point in which it is wiped under pressure by the sponge rubber wipers 41 and 42. Here the bottles are held at the back by a couple of discs 99 so that pressure may be applied to the labels while the bottles are stationary only. The clamping down of the bottles by caps 95 and the raising of the rotary bottle carrier so that the bottles will come to the right place for labeling and be held firmly in position has been described.

Figure 20:
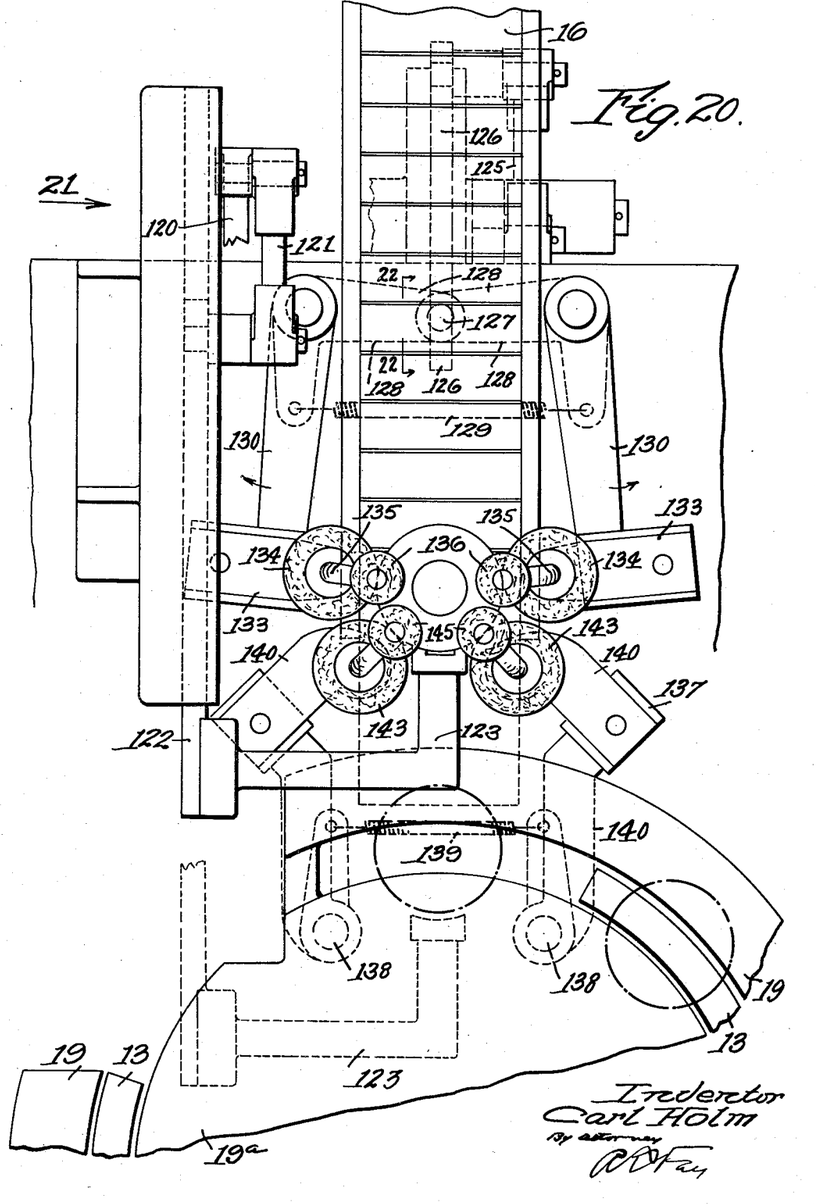
Fig. 20 is a plan of the delivery portion of the labeling machine.
Figures 21, 22:
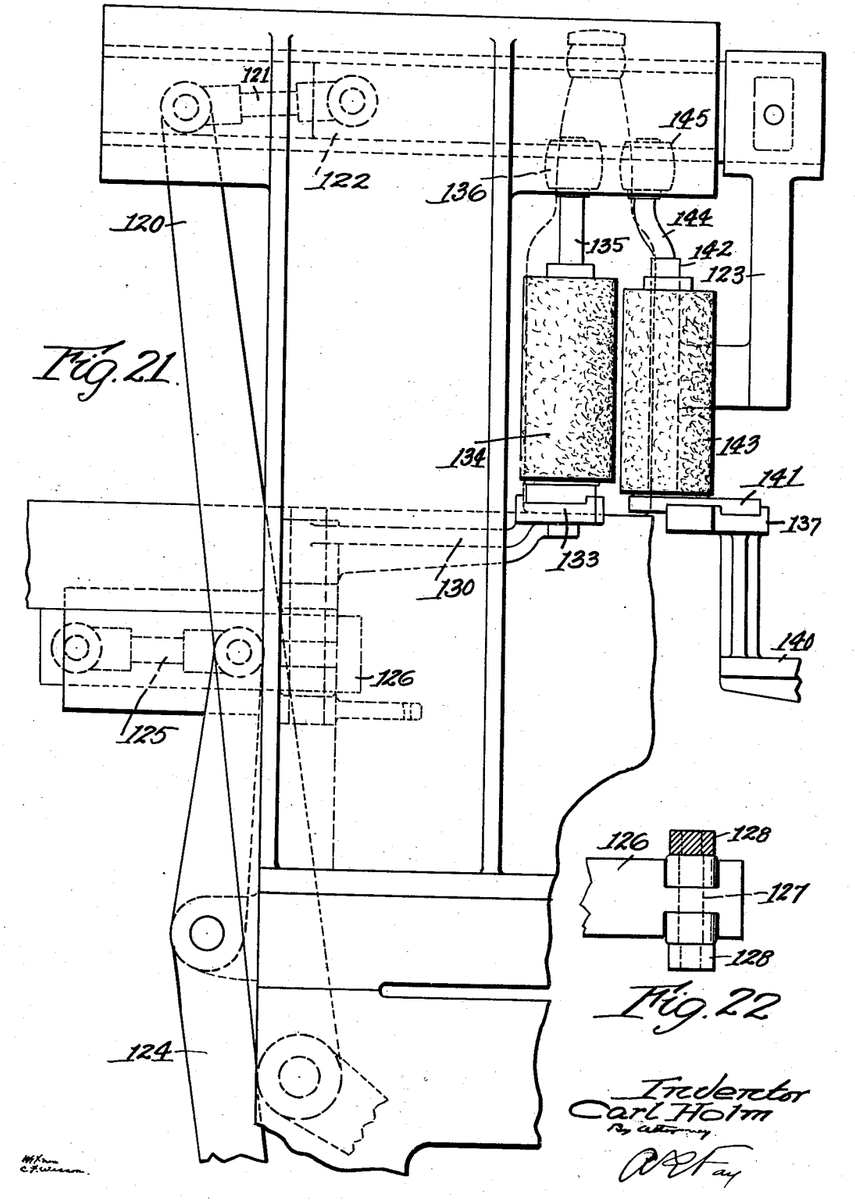
Fig. 21 is an elevation of the same looking in the direction of the arrow 21 in Fig. 20.
Fig. 22 is a plan of the part of the steadying roller slide.

The pressure wiping is an important feature because it permits of the application of the labels to the bottle without any motion of the wiper along the surface of the labels. A bottle which has been operated upon by the pressure wiper is then moved around intermittently with the other bottles until it comes to the position shown in Fig. 20 where it is pushed out by the discharge pusher. The bottle then passes in a radial manner outwardly first through a pair of front soft wiper rolls 143 for operating on opposite sides of the body label, each of which rolls has attached to it a soft neck label wiper roll 145. These are spring-controlled and the bottle has to pass through them with a consequent rolling wiping down of the labels on the bottle and neck. Just after the bottle reaches these roll label wipers it comes in contact with the pair of rolls 134 and neck rolls 136. This keeps the bottle in position after wiping by the wiping rolls 143 and 145. All these wipers thus described are made of sponge rubber, preferably, and they are all in rolling contact with the label so that they move with the label and cannot put any resistance against the label or any force to tend to move the label backwardly on the bottle.

It will be seen that by the use of this invention the rotary table for supporting the bottles while they are being labeled is made smaller than is usually the case. With its tangential feeding conveyor they both occupy less space than has been the case heretofore. This special arrangement renders the machine readily adaptable to the placing of a battery of machines close to each other to be fed by one conveyor. The pusher moves the bottles on the labeling machine by gripping them and holding them until they are in position instead of merely pushing them on loosely. This action takes place both at the bottom of the bottle and at the neck by a straight line motion. It also takes place at the necks of the bottles as well as at their bodies. The labeling machine is made up of three rings, two stationary and one oscillatory. The intermittent motion is secured from the oscillating motion. The bottles are passed around a circular course but not throughout the length of the circle. The oscillatory bottle support moves the bottle intermittently, thus providing a short motion at a time for the purpose of intermittently advancing the bottles around a circle. The oscillatory support is operated in a very simple manner. The bottles are carried on the bottle support and clamped down from the top by a circular cap member which is operated in cooperation with the intermittently rotatable support.

It will be seen that the bottles are held firmly while moved forwardly on the machine and that they are held firmly while being labeled intermittently by that machine. The labeling machine is provided with discs which engage the bottles to back them up while they are being labeled by the pressure method, thus avoiding considerable mechanism. The bottle carrier slide, by means of a short movement, lowers the top clamping means for the bottles and raises the table to clamp the bottles in position also. The means for lowering the central shaft, which carries on it the top heads for clamping the bottles, is operated in a very simple manner. The bearing, on which the oscillatory bottle carrier is carried, is raised and lowered for the purpose of clamping the bottles upward from the bottom and releasing them so that they can be held in position while being labeled and carried along on the oscillatory carrier until they come to the discharge end of the machine. The bottles are discharged through a radial carrier and, having been wiped by the pressure wiping on the machine itself, they are wiped by a pair of sponge rubber wipers applied at the neck and body simultaneously. As it leaves these wipers operating when the bottle enters a certain place it is steadied by the rolls 134 and 136. These latter wipers move about their axes with the labels.

Having thus described my invention and the advantages thereof, I do not wish to be limited to the details herein disclosed, otherwise than as set forth in the claims, but what I claim is:

1. The combination of an intermittently rotatable carrier for articles to be labeled, means for intermittently raising said carrier, moving it along, lowering it, and moving it backward, means for gripping such articles, one by one, depositing one article on said carrier while the carrier is stationary, and then releasing said article so that the carrier, on its forward motion, will advance the article, and means for pushing the article from the carrier radially at about 270° from its point of entry.

2. In a labeling machine, the combination of a frame, a central rod extending to the top of the frame and having arms projecting radially therefrom, caps mounted on said arms for engaging and holding the tops of articles carried by the machine, a sleeve on said rod, an article support on said sleeve, a bearing at the bottom of the sleeve, and means for moving the bearing and sleeve up for the purpose of applying pressure to the bottoms of the articles against said caps.

3. In a bottle labeling machine, the combination of a frame having a vertical passage through it, a sleeve mounted in said passage, a rod mounted in the sleeve and having a collar thereon near the bottom by which it can be pushed down and a bearing above the frame by which it can be pushed either up or down, means for operating each of said collars so as to move the rod down and move the sleeve either up or down, means connected with said rod for clamping down the tops of the bottles on the machine, and means connected with said sleeve for supporting the bottoms of the bottles and pushing the bottles up against said caps to clamp the bottles.

4. In a bottle labeling machine, the combination of a frame having a vertical passage therethrough, a sleeve mounted in said passage, a rod mounted in the sleeve and having a collar thereon near the bottom by which it can be pushed down and a collar above the frame on said sleeve by which it can be pushed either up or down, means for operating each of said collars, so as to move the rod down and move the sleeve either up or down, means connected with said rod for forcing down the tops of bottles in the machine, means connected with said sleeve for supporting the bottoms of said bottles, a cylinder, a guide plate fixed to the cylinder and extending downwardly, and a clamp carried by the rod and having a recess for receiving said guide and holding the said cylinder against turning on said rod.

5. In a labeling machine, the combination of a reciprocating slide, means for reciprocating said slide, said slide having two slots in it extending in the general direction of its reciprocation, one slot being high at one end and the other high at the other end, a pair of rolls entering said slots, whereby, as the slide reciprocates in one direction, one roll will move down and the other will move up, two yokes connected with the two rolls and pivotally mounted and independently movable with respect to each other, means for pressing a bottle down and holding it there at the top, and means for supporting the article at the bottom, one of said yokes being in position to control the raising of said slide and the other connected to control the lowering of the means for clamping the articles down.

6. In a labeling machine, the combination of a reciprocating slide, means for reciprocating said slide, said slide having two slots in it extending in the general direction of its reciprocation, one slot being high at one end and the other high at the other end, a pair of rolls entering said slots, whereby, as the slide reciprocates in one direction, one roll will move down and the other will move up, two yokes connected with the two rolls and pivotally mounted and independently movable with respect to each other, means for pressing a bottle on its support and holding it there at the top, and means for supporting the bottle at the bottom, one of said yokes being in position to control the raising of the bottle support and the other connected to control the lowering of the means for clamping the bottles down, whereby, the bottles can simply be set on one support, pressed down from above so as to move positively with that support thereafter, pressed upwardly from below above said bottle support, and finally dropped on the support by the raising of the top holding means to release the bottle for discharge.

7. In a labeling machine, the combination of a circular article supporting device, oscillatable about its vertical axis and movable up and down, means for transferring in a radial direction an article to be labeled on the oscillatable article support when it is down, a stationary circular article support for supporting the articles in stationary position when the oscillatable article support moves backward in its lower plane, and means for moving the oscillatable article supporting device above the stationary article support, whereby the article moves forward with the oscillatable support in an intermittent rotary action.

8. In a labeling machine, the combination of a circular article supporting device oscillatable about its axis, means for transferring an article to be labeled onto said supporting device radially with respect thereto, a stationary circular article support concentric with said axis, and located between the upper and lower planes of the supporting device, on which the article is left in stationary position when the oscillatable support moves backward at a lower level, whereby the article moves forward with an intermittent rotary motion, and means for discharging the articles in a radial direction at approximately 270° from the direction at which the articles were introduced before they have moved around a complete circle.

9. In a machine for labeling articles, the combination of a frame, a vertical rod carried thereby, a fork carried by said rod and movable thereon, a second vertical rod, a collar fixed on the second rod, said fork engaging the collar to push it down and depress the last named rod, a support for an article adapted to be held in the machine, and a circular member fixed to the top of said last named rod and having means thereon for engaging the top of said article, whereby, when the fork descends, said article will be engaged and held in place.

10. In a machine for labeling articles, the combination of a frame, a pair of vertical rods carried thereby, a pair of forks, one carried by each rod and movable thereon, means for moving the forks separately, a central vertical rod, a collar fixed on the central rod, one of said forks engaging the collar to push it down and depress the central rod, a support for articles in the machine, a circular member fixed to the top of said central rod and having means thereon for engaging the tops of said articles, whereby, when the last named fork descends, said articles will be engaged and pushed down, a cylinder, an article support on the cylinder, and means operated by said last named fork for raising said cylinder, timed in synchronism with said last named fork to ascend when the articles are pushed down and to clamp the articles.

11. In a labeling machine, the combination of a frame, a central rod extending to the top of the machine and having radial arms projecting therefrom, caps mounted on said arms for engaging the tops of articles on the machine, a sleeve on said rod, means on the sleeve for carrying said articles, a bearing at the bottom of the sleeve, and means for moving the bearing and sleeve up and down for the purpose of clamping the articles between said caps and said first named means and releasing them.

12. In a labeling machine, the combination of an oscillatory wheel, a stationary wheel adjacent thereto, a cylindrical support on which the oscillatable wheel is carried and with which it moves, means for moving the oscillatable wheel up above the stationary wheel at one end of the wheel and down below it at the other end, said support having an arm projecting therefrom, a reciprocatory member having a space for receiving said arm, a rod for reciprocating said member, means for operating the rod, whereby the arm, together with the cylinder and the first named wheel, will oscillate while the machine is running, and means for transmitting the forward motion to the bottle intermittently.

CARL HOLM.